(12) United States Patent
Carels (10) Patent No.: US 10,480,148 B2
(45) Date of Patent: Nov. 19, 2019

(54) ELASTIC FOUNDATION

(71) Applicant: CDM NV, Overijse (BE)

(72) Inventor: Patrick Carels, Overijse (BE)

(73) Assignee: CDM NV, Overijse (BE)

( * ) Notice: Subject to any disclaimer, the term of this patent is extended or adjusted under 35 U.S.C. 154(b) by 0 days.

(21) Appl. No.: 15/772,949

(22) PCT Filed: Nov. 3, 2016

(86) PCT No.: PCT/IB2016/056625
§ 371 (c)(1),
(2) Date: May 2, 2018

(87) PCT Pub. No.: WO2017/077482
PCT Pub. Date: May 11, 2017

(65) Prior Publication Data
US 2018/0327993 A1 Nov. 15, 2018

(30) Foreign Application Priority Data

Nov. 3, 2015 (BE) .................................. 2015/5715

(51) Int. Cl.
*E02D 27/34* (2006.01)
*F16F 1/373* (2006.01)
*F16F 7/00* (2006.01)

(52) U.S. Cl.
CPC ............ *E02D 27/34* (2013.01); *F16F 1/3735* (2013.01); *F16F 7/00* (2013.01)

(58) Field of Classification Search
CPC . E02D 27/34; F16F 7/00; F16F 1/3732; F16F 1/3735; F16F 1/08
See application file for complete search history.

(56) References Cited

U.S. PATENT DOCUMENTS

| | | | |
|---|---|---|---|
| 6,502,883 B2 * | 1/2003 | Rice ..................... | B60G 99/004 267/220 |
| 6,523,817 B1 * | 2/2003 | Landry, Jr. ............ | F16F 1/3732 267/141.2 |
| 6,820,908 B1 * | 11/2004 | Tousi ..................... | F16F 15/08 248/609 |
| 2010/0327502 A1 * | 12/2010 | Nakamura ............ | F16F 1/3732 267/141 |

(Continued)

*Primary Examiner* — Andrew J Triggs
(74) *Attorney, Agent, or Firm* — B rowdy and Neimark, PLLC (57) ABSTRACT

Elastic support with a fastening, in particular with uplift protection, for uncoupling foundations and buildings and/or cores of buildings, whereby it comprises a support element (1), an elastically compressible insulator (3) and stabiliser (2), a fastening element (8) and a pre-stress element (11), whereby the support element (1) is vertically movable by a tensile force (PB) and/or a pressure force (PA), whereby, the stabiliser (2) extends at least partly in a stabiliser chamber (16) having a free space (17) between a bulge side (14) and a wall (18), whereby the bulge side (14) of the stabiliser (2) is free and its bulging is not hindered in a free position as long as a given authorised deflection (26) is not exceeded, and whereby the bulge side (14) of the stabiliser (2) bulges out up against the wall (18) which prevents any further bulging in a blocked position when the stabiliser (2) is being compressed and the given authorised deflection (26) is exceeded.

19 Claims, 3 Drawing Sheets (56) References Cited

U.S. PATENT DOCUMENTS

2013/0045044 A1* 2/2013 Akiyama ................ F16B 31/00
  403/291
2018/0327993 A1* 11/2018 Carels .................... E02D 27/34

* cited by examiner

ELASTIC FOUNDATION

The invention concerns an elastic support with a fastening for securing a support element and a base in a uncoupled manner in order to prevent vibrations from travelling between said support element and said base.

The elastic support hereby comprises, apart from the fastening and the support element, an elastically compressible insulator and an elastically compressible stabiliser. The insulator comprises an elastomer and is situated between a support face of the support element and the base on which the insulator is intended to rest with a lower side. The elastically compressible stabiliser comprises an elastomer situated between the insulator and a pre-stress element. The fastening comprises a fastening element for fixing the support element to the base. The pre-stress element cooperates with this fastening element to elastically compress the stabiliser between said pre-stress element and the insulator and to simultaneously elastically compress the insulator between the support face and the base.

The support face of the support element can hereby be moved in relation to the base by a tensile force and/or a pressure force, whereby, when the tensile force is exerted on the support element, the stabiliser is elastically compressed and, when the pressure force is exerted on the support element, the insulator is elastically compressed. The insulator and the stabiliser each have a bulge side which elastically bulges out in a compressed state of the insulator or the stabiliser, respectively.

The invention in particular relates to an elastic support wherein the fastening comprises a uplift protection for uncoupling foundations and buildings and/or cores of buildings. This support comprises the support element and elastomer dampers. The elastomer dampers consist of at least the insulator and the stabiliser. The support element rests on the insulator and preferably extends at least partly between the elastomer dampers. The support element is further connected to the building or the core of the building. The insulator hereby connects with a top side to the lower support face of the support element, whereas the stabiliser connects with a lower side to an upper support face of the support element.

The fastening element is provided for fixing the support element to the base on which the insulator rests with a lower side, such that the fastening element makes no direct contact with the support element, nor with the base. Further, the pre-stress element cooperates with the fastening element to elastically compress the stabiliser between this pre-stress element and the upper support face and to simultaneously also compress the insulator between the support face and the base.

Thus, the insulator and the stabiliser are elastomer dampers which can be elastically compressed or also stressed by compressing them. By the elastic compression of an elastomer is meant herein the elastic deformation of the elastomer by exerting a pressure force whereby the elastomer bulges out and/or also whereby the volume of the elastomer is reduced. When the insulator and/or the stabiliser is/are thus compressed between an upper side and a lower side, they will laterally expand in a free space and thus exhibit a bulge.

When an upward tensile force is exerted on the support element, the stabiliser will be compressed, and when a downward pressure force is exerted on the support element, the insulator will be compressed. The insulator and the stabiliser hereby each have a laterally bulge side. When compressing the insulator and/or the stabiliser, they will be elastically deformed and the bulge side will elastically bulge out.

The invention also relates to a method for uncoupling elements that are secured together, in particular foundations and buildings and/or cores of building by means of such an elastic support with a fastening and/or uplift protection.

According to the present state of the art, cores and/or walls of large buildings with several floors are currently uncoupled from the base in order to avoid any transmission of vibrations from the environment. This increases the comfort in the building. It also reduces the risk of damage caused by these vibrations. This is particularly so in the case of earthquakes, for example.

Uncoupling is done by making these constructions rest on elastic vibration dampers, or also insulators. These may be elastomer blocks or steel springs, for example. Suitable elastomers are polyurethane elastomers, natural rubber, neoprene rubber or other elastomers which are well known for these applications by persons skilled in the art.

For high buildings, however, the vertical movement should be kept to a minimum because of the stability of these constructions.

In case of occasional wind loads and/or earthquakes, an upward force is exerted on the constructions, implying a danger for these constructions, partly due to the elastic dampers or insulators on which they rest, to start leaning over and subsequently topple. This is particularly so with lighter constructions and/or constructions with a high centre of gravity.

The dampers may therefore only allow for a limited movement, in particular in an upward sense. A safe and stable fastening by the stabiliser thus requires a high pre-stressing of said damper, which is detrimental to the vibration damping by the insulator.

The invention aims to remedy these disadvantages by proposing an elastic support with a simple construction for a fastening and/or an uplift protection with a stabiliser with which sufficient stabilisation is obtained, in particular in the upward sense, without having any negative impact on the vibration damping by the insulator. Further, the invention also aims to propose a method whereby the above-mentioned disadvantages are remedied.

To this aim, the invention proposes a stabiliser which gradually stiffens until a stiffness is finally obtained whereby the movement, in particular the vertical movement, is maximally restricted, as set out in the appended claims.

Practically, the stabiliser extends at least partly in a stabiliser chamber with a free space between the bulge side and a wall of the stabiliser chamber whereby, when the stabiliser is compressed between the pre-stress element and the insulator, and a given deflection of the support element in relation to the base is exceeded, the bulge side of the stabiliser will bulge out and extend up to the wall of the stabiliser chamber which prevents any further bulging.

Advantageously, the bulge side of the stabiliser will bulge out and extend up to the wall of the stabiliser chamber which prevents any further bulging when the stabiliser is compressed between the pre-stress element and the upper support face of the support element and a given vertical upward deflection of the support element has been exceeded.

In a very advantageous manner, the upward tensile force will then exceed an upward limit value and also the stiffness of the stabiliser will be greater than the stiffness of the insulator.

The invention also relates to a method for fastening and/or securing an elastic support, for example to uncouple foundations and buildings and/or cores of buildings whereby, when a load is exerted on the support element by an upward tensile force, the stabiliser is elastically compressed and this stabiliser will elastically bulge out via a bulge side on the one hand, or, when a load is exerted on the support element by a downward pressure force, the insulator is elastically compressed and this insulator will elastically bulge out via a bulge side, as a result of which the support element is subjected to a vertical upward and/or a vertical downward deflection.

When in this method the load includes the upward tensile force and this upward tensile force exceeds an upward limit value, the bulging of the bulge side of the stabiliser will be restricted up against the wall of a stabiliser chamber, as a result of which the stiffness of the stabiliser will drastically increase, thus preventing any further vertical upward deflection and restricting it to an authorised upward deflection, as set out in the appending claims.

Other particularities and advantages of the invention will become clear from the following description of practical embodiments of the method and device according to the invention; this description is given as an example only and does not restrict the scope of the claimed protection in any way; the reference figures used hereafter refer to the accompanying drawings.

In the different figures, the same reference figures refer to identical or analogous elements.

The invention more generally concerns an elastic support with a fastening which is provided with a stabiliser for uncoupling assembled elements such as a support element and a base in order to prevent and/or restrict any transmission of vibrations between these elements, whereby as a result of a gradual stiffening of the stabiliser and/or the insulator, the deflection of the elements in relation to one another is restricted. The deflection of the support element in relation to the base results in a compression of the stabiliser, a relief of the insulator and an increase of the distance between the support element and the base. The gradual stiffening of the stabiliser ensures a maximum authorised deflection of the support element in relation to the base.

The invention generally also concerns an elastic support with an uplift protection for uncoupling foundations and buildings and/or cores of buildings, in particular for uncoupling cores and walls from the underlying foundations and/or base.

The elastic support hereby consists of a support element on which is placed an element, construction, building and/or core of the building to be uncoupled and one or several insulators and stabilisers via which the support element is elastically fixed to a base or also a foundation. The insulators and stabilisers consist of elastically deformable elastomer dampers such as elastomer blocs or mats. The entire construction hereby preferably rests on the insulators via one or several support elements, and the support elements only make contact with the base via these insulators and stabilisers.

The stabilisers have to ensure that, in case of an upward force, for example due to a strong vibration or wind, the vertical movement of the construction resting on the support will not be too large. In case of an excessive upward vertical movement, said construction might for example lean over and topple. Also, the stabilisers should not hinder the operation of the insulators.

To this end, the stabilisers are provided such that they gradually stiffen from a stiffness which is preferably lower than the stiffness of the insulators up to a stiffness which is much higher than the stiffness of the insulators. The ultimate high stiffness of the stabiliser hereby restricts the vertical upward movement of the support element to a maximum.

This is achieved by placing the stabilisers in a stabiliser chamber, such that they are surrounded all around on the lateral sides by a free space which is restricted by a surrounding wall. As the stabiliser can freely bulge laterally in the free space, its stiffness can be kept quite low, preferably lower than the stiffness of the insulator. When, however, the stabiliser is compressed up to a certain level by a given vertical upward movement of the support element, the free space will be entirely occupied by the bulging of the stabiliser and the walls will prevent any further bulging. As a result, the stiffness of the stabiliser will increase drastically, to above the stiffness of the insulator. Any further depression of the stabiliser is then prevented and, consequently, also any further vertical upward movement of the support element with the construction on it will be restricted.

According to a first embodiment, the elastic support comprises a support element 1 consisting of a hollow metal structure as shown in FIGS. 1 to 5. The construction 24 to be uncoupled is placed on the preferably horizontal upper side 23 of this structure, which construction forms a load to be supported by the support element 1.

Figure 1:
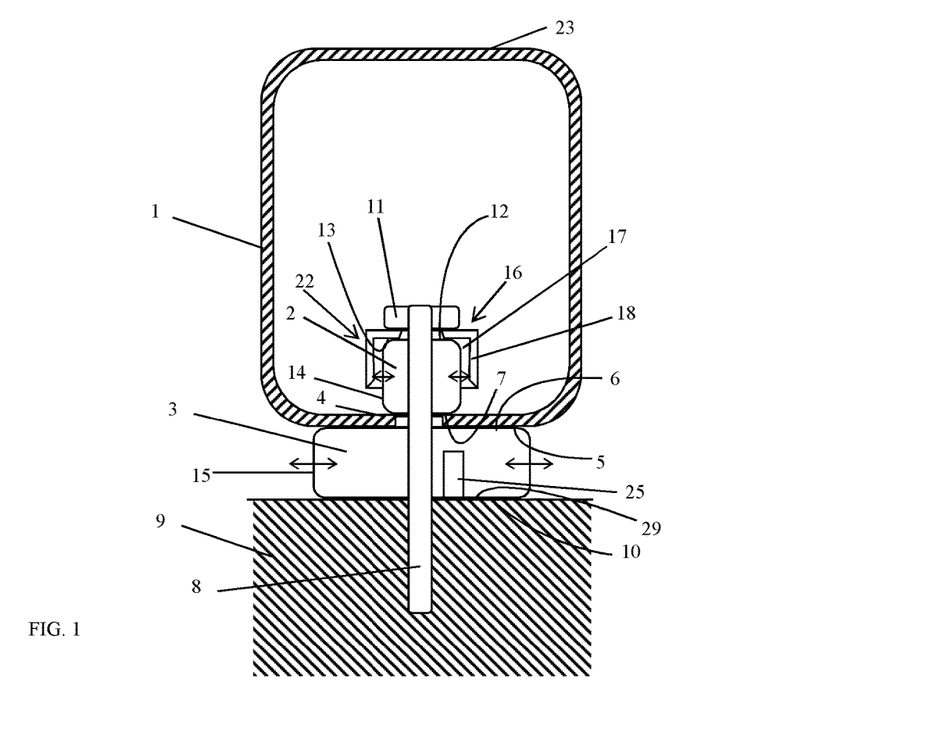
FIG. 1 is a schematic representation of an elastic support according to a first embodiment of the invention whereby no load is imposed.
Figure 2:
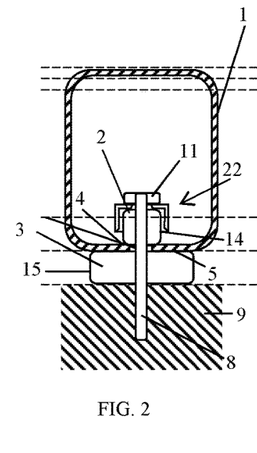
FIG. 2 is a schematic representation of an elastic support according to a first embodiment as in FIG. 1.

On its lower side, the metal structure has an upper support face 4 and a lower support face 5. These support faces 4 and 5 extend on opposite sides of a practically horizontal part of the support element 1.

The structure rests on a base 9 or also a foundation via at least one insulator 3 which connects with an upper side 6 to the lower support face 5 and with a lower side 10 to the base 9 or foundation. The insulator 3 is an elastically deformable elastomer damper known as such.

On the upper support face 4 is at least provided a stabiliser 2 which connects with a lower side 7 to this upper support face 4. The stabiliser 2 and the insulator 3 are elastically deformable elastomer dampers known as such, and in this first embodiment they are beam-shaped. The elastomer dampers may of course also be, for example, cylindrical or spherical.

Consequently, the support element 1 in part extends between one or several insulators 3 and one or several stabilisers 2.

By means of one or several fastening elements 8, the support element 1 is fixed to the base 9. This fastening element 8 preferably extends at least as of an upper side 12 of the stabiliser 2 to beyond the lower side 10 of the insulator 3.

This fastening element 8 comprises a bolt which is fixedly mounted in the base 9 and extends transversely through the insulator 3, the support element 1 and the stabiliser 2. This fastening element 8 hereby makes no direct contact with the support element 1. Contact is only made via the insulator 3 and the stabiliser 2.

Figure 3:
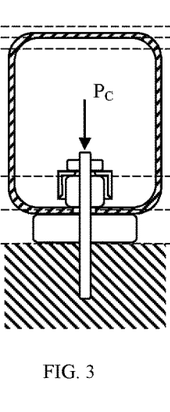
FIG. 3 is a schematic representation of an elastic support according to FIG. 2 whereby the insulator and the stabiliser are compressed because a pre-stress is imposed.

Further, a pre-stress element 11 is used which connects to the upper side 12 of the stabiliser 2 and cooperates with the fastening element 8 to elastically compress the stabiliser 2 between this pre-stress element 11 and the upper support face 4 and simultaneously also elastically compress the insulator 3 between the lower support face 5 and the base 9, as shown in FIG. 3.

In this first embodiment, the pre-stress element 11 is formed of a nut and a metal cap 22. The cap 22 is placed over the stabiliser 2, so that it fits with a flat inner side 13 to the upper side 12 of the stabiliser 2. The bolt of the fastening element 8 extends transversely through this cap 22. By means of the nut which is provided on a thread in the bolt above the cap 22, said cap 22 is tightened against the stabiliser 2. As a result, the stabiliser 2 and the insulator 3 are compressed as well, such that the support element 1 is clamped in between. As a result, the pre-stress element 11 provides for the required pre-stress on the stabiliser 2 and the insulator 3.

Due to the downward force $P_C$ imposed hereby, the insulator 3 and the stabiliser 2 will be each compressed according to their respective stiffness. This can be analysed as follows:

$$K_T = \frac{1}{\frac{1}{K} + \frac{1}{\alpha K}}$$

$$\delta_{s,P_C} = \frac{P_C}{\alpha K}$$

$$\delta_{i,P_C} = \frac{P_C}{K}$$

wherein
$K_T$, is the total stiffness of the elastic support,
K, is the stiffness of the insulator 3,
αK, is the stiffness of the stabiliser 2,
α, is the ratio of the stiffness of the stabiliser 2 in relation to the stiffness of the insulator 3,
$P_c$, is the force exerted by the pre-stress,
$\delta_{sPc}$, is the vertical movement resulting from the compression of the stabiliser 2 under the influence of the pre-stress,
$\delta_{iPc}$, is the vertical movement resulting from the compression of the insulator 3 under the influence of the pre-stress.

The stabiliser 2 and the insulator 3 each have a bulge side 14 and 15 via which, when compressed, they elastically bulge out. In the case of the stabiliser 2, this bulge side 14 is the free side situated between the flat inner side 13 of the cap 22 and the upper support face 4 of the support element 1. In the case of the insulator 3, this bulge side 15 is the free side situated between the lower support face 5 of the support element 1 and the base 9. These bulge sides 14 and 15 preferably extend over the entire perimeter of the insulator 3 and/or stabiliser 2.

When an upward tensile force $P_B$ is exerted on the support element 1 by the load, the stabiliser 2 will be elastically compressed. The insulator 3 is thereby relieved as well.

When, due to the load, a downward pressure force $P_A$ is exerted on the support element 1, the insulator 3 will be elastically compressed. The stabiliser 2 is relieved thereby, and the imposed pre-stress decreases.

Hence, in case of a normal operation, the insulator 3 is loaded and the stabiliser 2 is relieved by a downward force $P_A$ exerted on the construction, and/or the insulator 3 is relieved and the stabiliser 2 is loaded by an upward force $P_B$ exerted on the construction.

Figure 4:
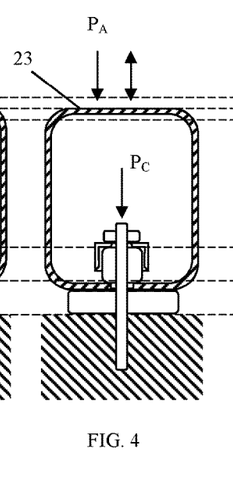
FIG. 4 is a schematic representation of an elastic support according to FIG. 3 whereby the insulator is further compressed by a load resting on the support element.

Thus, by placing the construction on the elastic support, the insulator 3 is loaded and a downward force $P_A$ is exerted thereon, such that said insulator 3 is compressed, as shown in FIG. 4. The vertical movement hereby depends on the stiffness of the insulator 3. This can be analysed as follows:

$$\delta_{i,P_A} = \frac{P_A}{K}$$

wherein
K, is the stiffness of the insulator 3,
$P_A$, is the downward force exerted by the construction,
$\delta_{i,P_A}$, is the vertical movement due to the compression of the insulator 3 under the influence of the force $P_A$ exerted by the construction.

Further, in case of a normal operation, the total stiffness of the elastic support can be represented as the sum of the stiffness of the insulator 3 and the stiffness of the stabiliser 2. The upward movement depends on this stiffness and has to be restricted to an authorised maximum value.

$$K_T = K(1 + \alpha)$$

$$\delta_{i,min} = \frac{P_B}{K(1 + \alpha)} \leq \text{authorised vertical deflection}$$

wherein
$\delta_{i,min}$, is the vertical movement under the influence of an upward force,
$P_B$, is an exerted upward force.

The vertical movement due to the compression of the insulator 3 under the influence of the pre-stress is hereby preferably larger than this movement under the influence of the upward force $P_B$ in order to prevent the support 1 from being detached from the construction.

$$\frac{P_C}{K} \geq \frac{P_B}{K(1 + \alpha)} \text{ or also } P_C \geq \frac{P_B}{1 + \alpha}$$

The stiffness of the stabiliser 2 should preferably be selected as low as possible to achieve an optimal vibration damping by the insulator 3, without it being influenced too much by the stabiliser 2. Consequently, the ratio α of the stiffness of the stabiliser 2 in relation to the stiffness of the insulator 3 is as small as possible.

Further, a vertical movement which is as small as possible should be pursued. Relatively small upward movements should be allowed by the stabiliser 2 whereas a large upward movement should be prevented. In order to restrict a vertical upward movement, the stiffness of the stabiliser 2 is preferably as large as possible, so that, consequently, the ratio α of the stiffness of the stabiliser 2 in relation to the stiffness of the insulator 3 has to be large as well.

According to this first embodiment, an elastic support is manufactured in a relatively simple manner whereby a stabiliser 2 is provided which is subjected to a gradual stiffening depending on the vertical movement of the support element 1. Thanks to a relatively small stiffness of the stabiliser 2 in the case of small vertical movements, these movements are hindered little. In case of an excessive upward movement, the stiffness of the stabiliser 2 is increased drastically, as a result of which this movement will be maximally restricted.

Figure 5:
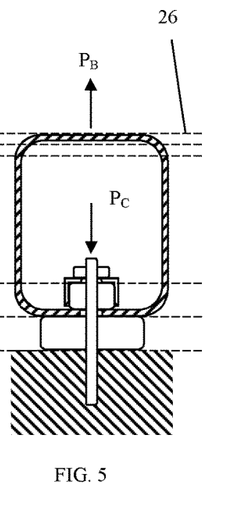
FIG. 5 is a schematic representation of an elastic support according to FIG. 4 whereby the stabiliser is compressed by an upward force exerted on the support element and whereby a maximal upward deflection is obtained.

According to this first embodiment, the metal cap 22 to this end forms a stabiliser chamber 16 for the stabiliser 2. The wall 18 of the cap 22 extends around the bulge side 14 of the stabiliser 2. Between this bulge side 14 and the cap 22 is situated a free space 17 in which the stabiliser 2 can freely bulge out when being compressed. When the upward tensile force $P_B$ further exceeds a limit value, the stabiliser 2 will be compressed such that it bulges out via the bulge side 14 and extends up against the wall 18 of the cap 22, as shown in FIG. 5. Any further bulging is prevented, as a result of which the stiffness drastically increases and a vertical movement is restricted to a maximum corresponding to the authorised vertical upward deflection.

Consequently, the dimensions of the cap 22 and the stabiliser 2 are selected such that, with the maximum upward movement 26, the stabiliser 2 is compressed and bulges out via the bulge side 14 up against the wall 18 of the cap 22. These dimensions depend on the specific circumstances and the characteristics of the construction and can be easily determined by someone skilled in the art.

The metal cap 22 thus makes sure that, in case of a predetermined upward movement, the stabiliser 2 cannot bulge out any further. The compression and possible elastic deformation of the stabiliser are hence reduced to a change in volume, such that any further compression of the stabiliser 2 is almost prevented.

This uplift protection prevents that, due to the elastic fastening of the support element 1, the construction placed thereon will start leaning over in case of an excessive upward movement. This is particularly important for high constructions such as apartment buildings.

Further, a fixed support 25 is preferably also provided on the base 9 so that, for example in case of an extreme downward pressure force, the insulator 3 will be merely compressed until the support element 1 rests on the fixed support 25. Thus, also the vertical downward movement is restricted.

Figure 6:
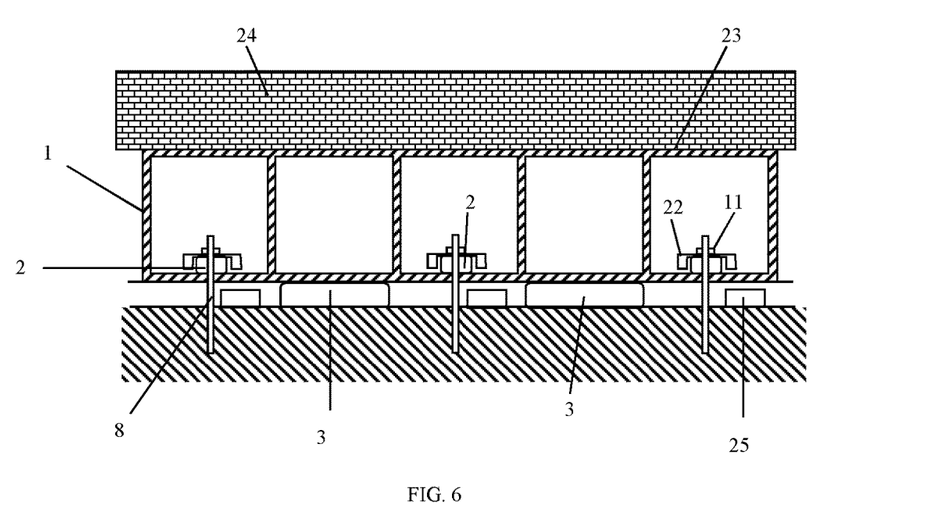
FIG. 6 is a schematic representation of an elastic support according to a second embodiment of the invention.

A second embodiment, schematically represented in FIG. 6, differs from the first embodiment in that the fastening elements 8 do not extend transversely through the insulators 3 but are situated next to these insulators 3.

Figure 7:
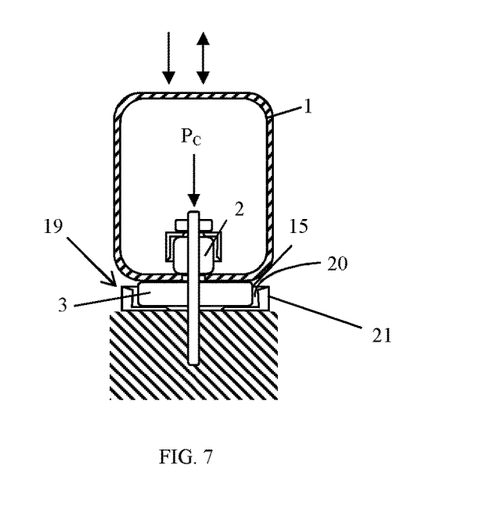
FIG. 7 is a schematic representation of an elastic support according to a third embodiment of the invention.

A third embodiment, schematically represented in FIG. 7, differs from the first embodiment in that a wall 21 is provided around the bulge side 15 of the insulator 3 forming an insulator chamber 19 with a free space 20 between the bulge side 15 and the wall 21 which enables the insulator 3 to bulge out when it is being compressed by a downward pressure force.

The wall 21 is placed such that when said downward pressure force exceeds a limit value, the bulge side 15 of the insulator 3 will extend up against the wall 21, and this wall 21 will prevent any further bulging. In this way, the stiffness of the insulator 3 is drastically increased and the downward deflection is brought to a halt.

A fourth embodiment, not represented in the figures, differs from the preceding embodiments in that the insulator 3 and/or the stabiliser 2 consist of one or several layers of elastomer dampers. Possibly, these elastomer dampers may also be provided with reinforcements in the shape of for example horizontal metal plates extending in the elastomer damper or between different layers of this damper.

Figure 8:
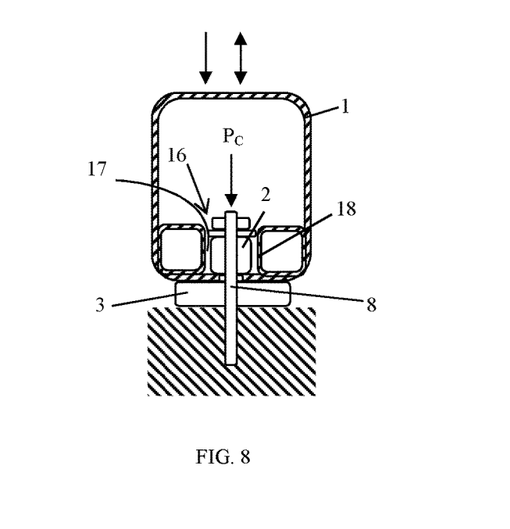
FIG. 8 is a schematic representation of an elastic support according to a fifth embodiment of the invention.

A fifth embodiment differs from the first embodiment in that the stabiliser chamber 16 is formed by walls 18 which are fixed to the support element 1, as shown in FIG. 8.

Figure 9:
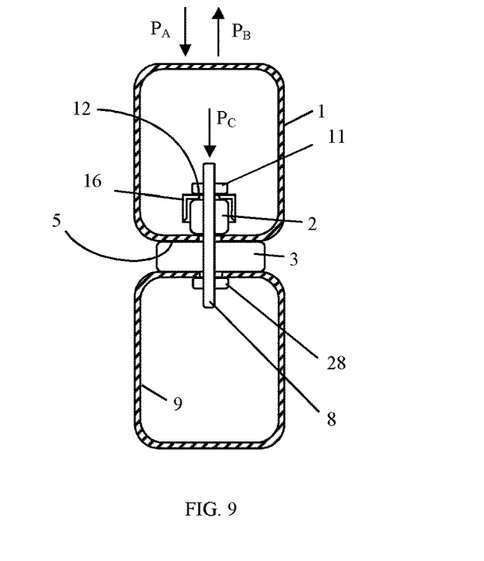
FIG. 9 is a schematic representation of an elastic support according to a sixth embodiment of the invention.
Figure 10:
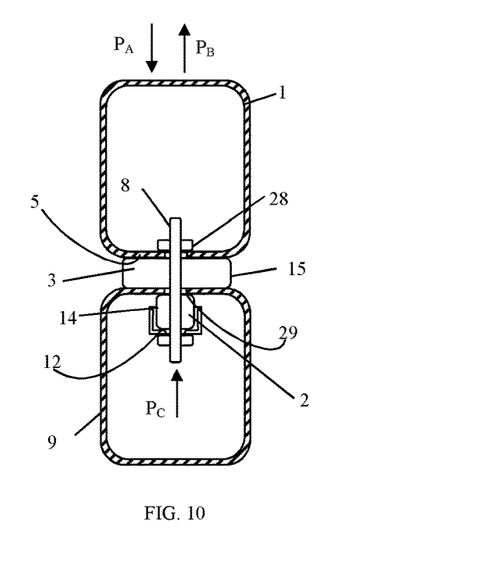
FIG. 10 is a schematic representation of an elastic support according to a seventh embodiment of the invention.

A sixth and seventh embodiment, represented in FIGS. 9 and 10 respectively, differ from the preceding embodiments in that the base 9 comprises a base element 27 with a base support surface 29 on which the insulator 3 rests with the lower side 10. Just as in the preceding embodiments, the support element 1 and the base 9 are secured to each other with the fastening element 8. In this embodiment, the base 9 is fastened to the support element 1 by means of the base element 27. To this end, use can be made of for example a nut 28, which may possibly also cooperate with the pre-stress element 11 to impose a certain pre-stress.

According to the sixth embodiment, the support element 1 extends at least partly between the stabiliser 2 and the insulator 3.

The seventh embodiment differs from the sixth embodiment in that the base element 27 extends at least partly between the stabiliser 2 and the insulator 3. Thus, the stabiliser 2 is situated under the insulator 3. Further, the pre-stress element 11 connects to the side 12 of the stabiliser 2 which faces away from the insulator 3. As a result, the stabiliser is situated between the insulator 3 and the pre-stress element 11. At least a part of the base element 27 thereby further extends between the stabiliser 2 and the insulator 3, such that also the stabiliser 2 extends between this base element 27 and the pre-stress element 11.

Figure 11:
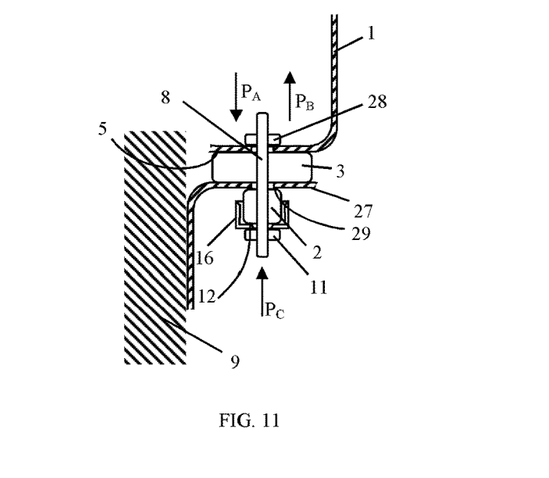
FIG. 11 is a schematic representation of an elastic support according to an eighth embodiment of the invention.

An eighth embodiment, represented in FIG. 11, mainly differs from the seventh embodiment in that the base 9 comprises a base element 27 consisting for example of a wall with an L-profile attached thereto. The base support surface 29, on which the insulator 3 rests, extends on the upper side of the L-profile. The stabiliser 2 in this embodiment extends under the insulator up against the base element 27 as in the seventh embodiment.

Also the stabiliser 2 may possibly extend above the insulator 3 with at least a part of the support element 1 between the insulator 3 and the stabiliser 2, such as for example in the first or the sixth embodiment.

Figure 12:
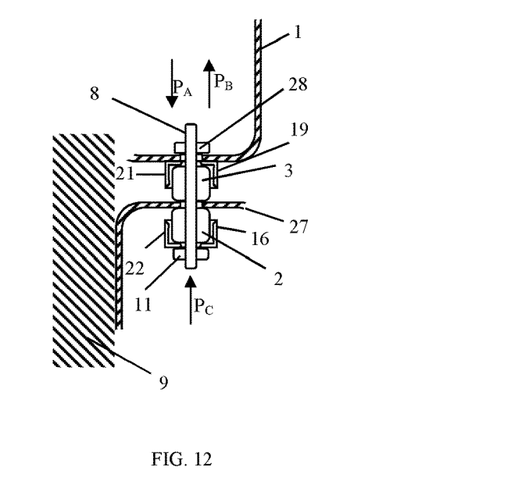
FIG. 12 is a schematic representation of an elastic support according to a ninth embodiment of the invention.

A ninth embodiment, represented in FIG. 12, mainly differs from the eighth embodiment in that the insulator 3 is provided with an insulator chamber 19 analogous to the one described above in the third embodiment.

Figure 13:
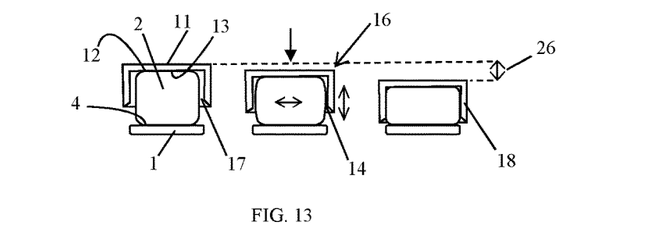
FIG. 13 is a schematic representation of a support element with an elastically compressible stabiliser and a pre-stress element according to an embodiment of the invention.

A tenth interesting embodiment of the invention comprises a support element 1 with an elastically compressible stabiliser 2 and a pre-stress element 11 with a stabiliser chamber 16. This tenth embodiment forms a major part of the elastic support of the preceding embodiments and may serve as such as a vibration damper and/or support.

The elastically compressible stabiliser 2 comprises an elastomer which connects to a supporting surface 4 of the support element 1. The stabiliser 2 hereby extends between the supporting surface 4 and the pre-stress element 11. In a compressed state of the stabiliser 2, the pre-stress element 11 elastically compresses the stabiliser 2 between this pre-stress element 11 and the supporting surface 4. The stabiliser 2 comprises a bulge side 14 which elastically bulges out when being compressed. The stabiliser preferably has two parallel opposite supporting surfaces. A first supporting surface bears on the supporting surface 4 of the support element while a second supporting surface bears on the pre-stress element 11. In between these supporting surfaces, the stabiliser 2 preferably has a bulge side 14 over its entire perimeter. The bulge side 14 may possibly be restricted to merely a portion of said perimeter. The stabiliser 2 at least partly extends in a stabiliser chamber 16 having a free space 17 between the bulge side 14 and a wall 18 of the stabiliser chamber 16.

The bulge side 14 of the stabiliser 2 is free and its bulging is not hindered in a free position as long as a given authorised compression of the stabiliser 2 is not exceeded.

The bulge side 14 of the stabiliser 2 bulges up against the wall 18 of the stabiliser chamber 16 which prevents any further bulging in a blocked position when the stabiliser 2 is being compressed and the given authorised compression is exceeded. This prevents any further compression.

Consequently, the stabiliser 2 in this stabiliser chamber 16 exhibits a gradual stiffening as it is being compressed, with a sudden sharp stiffening as soon as any further bulging of the stabiliser 2 is prevented by the walls 18 of the stabiliser chamber 16.

An additional advantage of the invention is that the insulator chamber 19 and/or the stabiliser chamber 16 prevent the insulator 3 and the stabiliser 2 from being compressed too far and from bulging until they are damaged, for example due to cracking.

Naturally, the invention is not restricted to the methods described above and to the embodiments described in the accompanying figures. Thus, the various characteristics of these embodiments may be mutually combined.

Thus, several fastening bolts 8 may extend next to one another through the insulator 3 and the stabiliser 2 for fastening the support element 1 to the base 9 and/or to the base element 27 of the base 9. Thus, several fastening bolts 8 may also extend next to one another next to the insulator 3 and the stabiliser 2 for fastening the support element 1 to the base 9 and/or to the base element 27 of the base 9.

Thus, the tensile force $P_B$ and/or the pressure force $P_A$ must not necessarily consist of a vertical force in the upward and/or downward sense, but these forces may also consist of horizontal and/or lateral forces. Thus, the base 9 must not necessarily extend horizontally, but it may also be oblique or vertical.

The invention claimed is:

1. An elastic support with a fastening which comprises:
a support element with a lower support face,
an elastically compressible insulator which comprises an elastomer and which is situated between the lower support face of the support element and a base on which the insulator is intended to rest with a lower side of the insulator,
a pre-stress element
an elastically compressible stabiliser, the stabiliser comprising an elastomer and the stabiliser being situated between the insulator and said pre-stress element,
a fastening element for securing the support element to the base,
wherein the pre-stress element cooperates with the fastening element to elastically compress the stabiliser between said pre-stress element and the insulator and simultaneously elastically compress the insulator between the lower support face and the base,
wherein the lower support face of the support element is movable in relation to the base by a tensile force and/or a pressure force, wherein, when the tensile force is exerted on the support element, the stabiliser is elastically compressed and, when the pressure force is exerted on the support element, the insulator is elastically compressed,
wherein the insulator and the stabiliser each have a bulge side which elastically bulges out in a compressed state of the insulator or the stabiliser respectively,
wherein the stabilizer extends at least partly in a stabiliser chamber having a free space between the bulge side and a wall of the stabiliser chamber,
wherein the bulge side of the stabiliser is free and the bulging is not hindered in a free position as long as a given authorised deflection of the support element in relation to the base is not exceeded,
wherein the bulge side of the stabiliser bulges out up against the wall of the stabiliser chamber which prevents any further bulging in a blocked position when the stabiliser is being compressed and the given authorised deflection is exceeded.

2. The elastic support with a fastening according to claim 1, wherein the support element or the base extends at least partly between the insulator and the stabiliser and does not make direct contact with the fastening element.

3. The elastic support with a fastening according to claim 1, wherein the fastening forms an uplift protection for uncoupling foundations and buildings and/or cores of buildings, wherein
the support element further has an upper support face,
the elastically compressible insulator connects to the lower support face,
the elastically compressible stabiliser connects to the upper support face,
the pre-stress element cooperates with the fastening element to elastically compress the stabiliser between said pre-stress element and the upper support face and to simultaneously elastically compress the insulator between the lower support face and the lower side,
wherein the support element or the base extends at least partly between the insulator and the stabiliser and does not make direct contact with the fastening element,
wherein the tensile force is an upward tensile forced, the pressure force is a downward pressure force, and the support element can be vertically moved by the upward tensile force and/or the downward pressure force,
wherein, when the upward tensile force is exerted on the support element, the stabiliser is elastically compressed and, when the downward pressure force is exerted on the support element, the insulator is elastically compressed,
wherein the given authorised deflection of the support element in relation to the base is a vertical upward deflection.

4. The elastic support according to claim 1, wherein in the free position, the stabiliser exhibits a stiffness which is smaller than or equal to a stiffness of the insulator, and wherein in the blocked position, the stiffness of the stabiliser is greater than the stiffness of the insulator as the stabiliser bulges up against the wall and any further bulging of the stabiliser is prevented.

5. The elastic support according to claim 1, wherein the given authorised deflection is exceeded as soon as the tensile force exceeds a limit value.

6. The elastic support according to claim 1, wherein the insulator is situated at least partly in an insulator chamber having a free space between the bulge side and a wall of the insulator chamber, and wherein the bulge side of the insulator extends up against the wall of the insulator chamber, and said wall prevents any further bulging in a position wherein the insulator is compressed and a certain deflection is exceeded.

7. The elastic support according to claim 1, wherein the fastening element extends at least as of a side of the stabiliser which connects to the pre-stress element to beyond the lower side of the insulator which is intended to connect to the base.

8. The elastic support according to claim 1, wherein the fastening element extends transversely through the support element, the stabiliser and/or the insulator.

9. The elastic support according to claim 1, wherein the insulator has a perimeter and wherein the bulge side of the insulator extends over the entire perimeter of the insulator between the lower support face and the base.

10. The elastic support according to claim 1, wherein the stabilizer has a perimeter and wherein the bulge side of the stabiliser extends over the entire perimeter of the stabiliser between the insulator and the pre-stress element.

11. The elastic support according to claim 1, wherein the stabiliser chamber is formed of a cap which is placed over the stabiliser, such that an inner side of the cap fits onto a side of the stabiliser.

12. The elastic support according to claim 11, wherein the cap is part of the pre-stress element.

13. The elastic support according to claim 1, wherein the compression due to the pre-stressing of the insulator is larger than the given authorised deflection for the stabiliser.

14. A support element with an elastically compressible stabiliser and a pre-stress element, wherein:
the support element has a supporting surface,
the elastically compressible stabiliser comprises an elastomer and connects to the supporting surface,
the elastically compressible stabiliser extends between the supporting surface and the pre-stress element,
in a compressed state of the stabilizer, the stabilizer is elastically compressed between said pre-stress element and the supporting surface,
wherein the stabiliser has a bulge side which bulges out elastically in the compressed state of the stabiliser,
wherein the stabiliser extends at least partly in a stabiliser chamber having a free space between the bulge side and a wall of the stabiliser chamber,
wherein the bulge side of the stabiliser is free and its bulging is not hindered in a free position when a given authorised compression of the stabiliser is not exceeded,
wherein the bulge side of the stabiliser bulges out up against the wall of the stabiliser chamber which prevents any further bulging in a blocked position when the stabiliser is being compressed and the given authorised compression is exceeded.

15. A method for fastening a support element to a base, wherein the support element is fastened to the base with a fastening element via a stabiliser and an insulator, wherein said stabiliser and said insulator comprise elastically compressible elastomer dampers,
wherein the support element is not allowed to make direct contact with the fastening element and/or with the base and wherein a lower support face of the support element, via the insulator, is made to rest on a base support surface of the base,
wherein the stabiliser is elastically compressed between a pre-stress element and the insulator and simultaneously the insulator is elastically compressed between the lower support face and the base support surface,
wherein, when a load is exerted on the support element by a tensile force, the stabiliser will be elastically compressed and said stabiliser will bulge out elastically via a bulge side, or, when a load is exerted on the support element by a pressure force, the insulator will be elastically compressed and said insulator will bulge out elastically via a bulge side,
wherein, as a result of the load exerted on the support element, the support element is subjected to a deflection,
wherein, when the load includes the tensile force and said tensile force exceeds a limit value, the bulging of the bulge side of the stabiliser is restricted to up against a wall of a stabiliser chamber, as a result of which stiffness of the stabiliser drastically increases and any further deflection is prevented and restricted to an authorised deflection.

16. A method for securing an elastic support for uncoupling foundations and buildings and/or cores of buildings,
wherein a support element is clamped between a stabiliser and an insulator, wherein said stabiliser and said insulator comprise elastically compressible elastomer dampers,
wherein the support element is fixed to a base with a fastening element via said stabiliser and said insulator, such that the support element does not make direct contact with the fastening element and/or with the base and wherein the support element is made to rest on the base via the insulator,
wherein the stabiliser and the insulator are compressed between a pre-stress element and the base,
wherein, in case a load is exerted on the support element by an upward tensile force, the stabiliser will be elastically compressed and said stabiliser will bulge out elastically via a bulge side on the one hand, or, when a load is exerted on the support element by a downward pressure force, the insulator will be elastically compressed and said insulator will bulge out elastically via a bulge side on the other hand,
as a result of which the support element is subjected to a vertical upward and/or a vertical downward deflection,
wherein, when the load comprises the upward tensile force and said upward tensile force exceeds an upward limit value, the bulging of the bulge side of the stabiliser will be restricted to up against a wall of a stabiliser chamber, as a result of which the stiffness of the stabiliser will drastically increase and any further deflection will be prevented and restricted to an authorised deflection.

17. The method according to claim 15, wherein the stiffness of the stabiliser is smaller than a stiffness of the insulator when the stabiliser can freely bulge out via the bulge side when being compressed.

18. The method according to claim 15, wherein the stabiliser is compressed between the pre-stress element and the insulator, such that the compression of the insulator is larger than the given authorised deflection.

19. The method according to claim 15, wherein, when the load includes the pressure force and said pressure force exceeds a limit value, any bulging of a bulge side of the insulator will be restricted to up against a wall of an insulator chamber, and said wall prevents any further bulging.

\* \* \* \* \*